Figure 1:
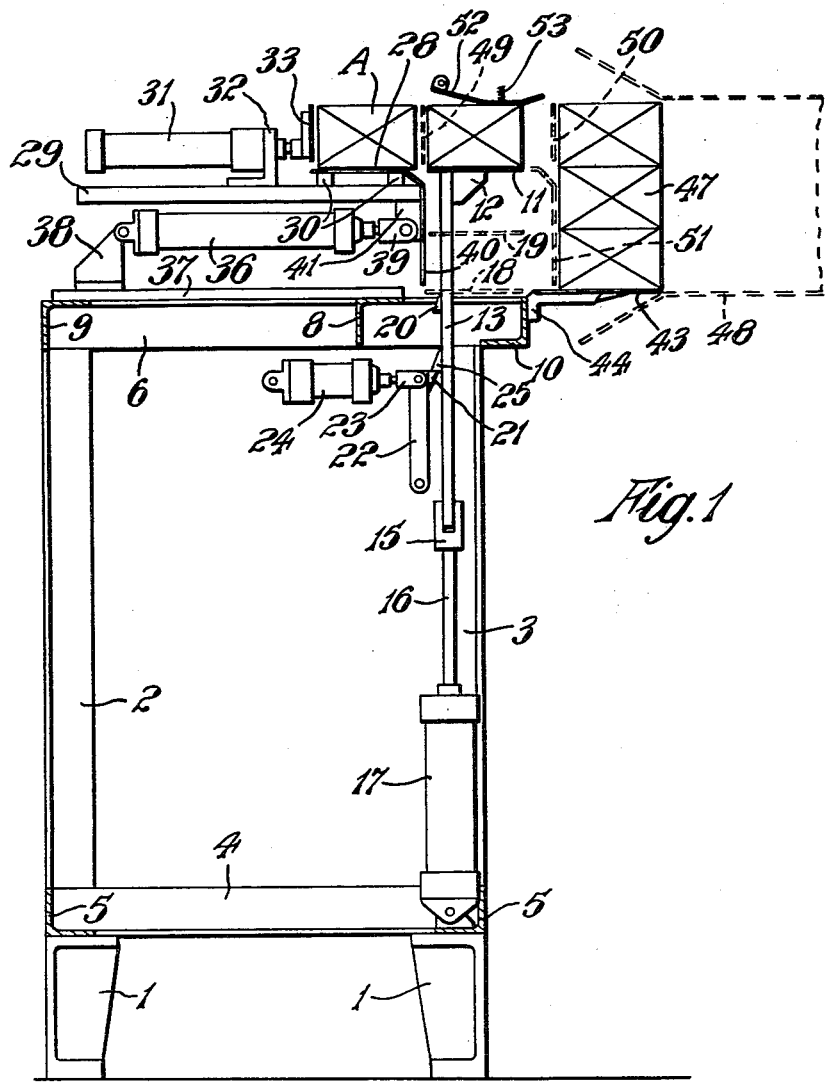

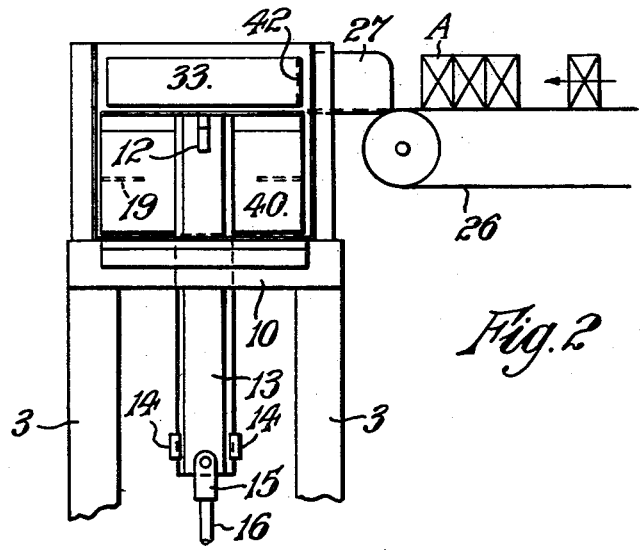
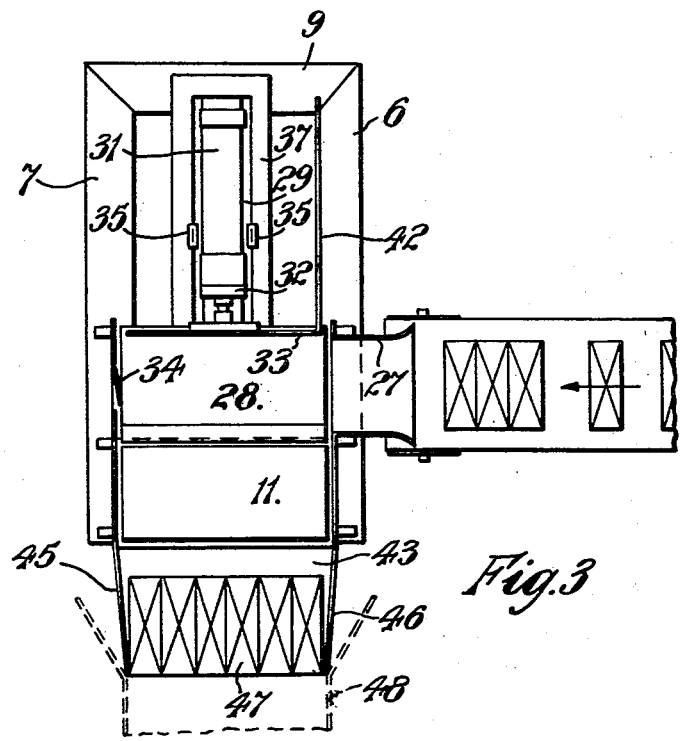

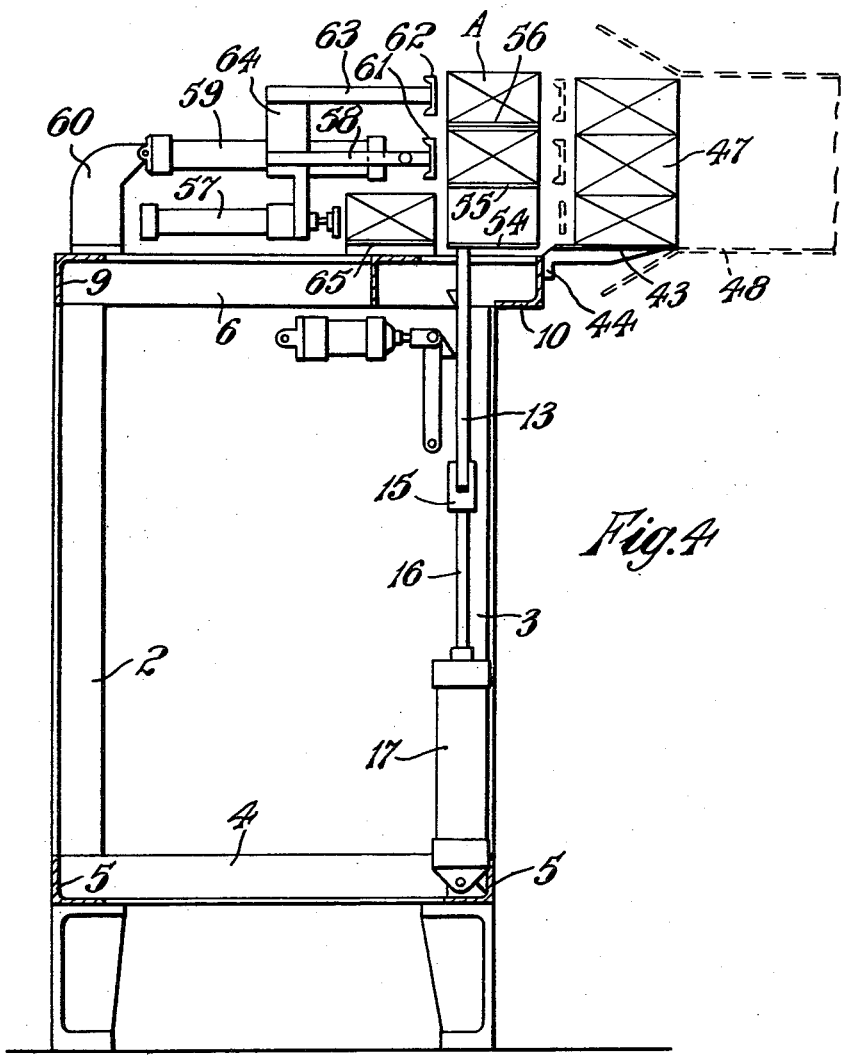

United States Patent Office 3,107,013
Patented Oct. 15, 1963

3,107,013
METHOD AND MEANS FOR STACKING ARTICLES
Gerrit Evert Euwe, Vlaardingen, Netherlands, assignor to Lever Brothers Company, New York, N.Y., a corporation of Maine
Filed Aug. 26, 1960, Ser. No. 52,291
Claims priority, application Great Britain Sept. 7, 1959
9 Claims. (Cl. 214—6)

This invention relates to methods of and apparatus for stacking articles.

The present invention provides a method of stacking articles which comprises the steps of forming a horizontal row of articles, moving said row horizontally in a transverse direction over a distance at least equal to the width of the row in order to form a horizontal layer consisting of one or more adjacent rows, moving the layer vertically over a distance equal to its height, repeating said steps until the penultimate row has been added to the block of articles thus formed, and moving said block during its completion by the final row over a distance at least equal to its width in the same horizontal direction in which the separate rows are moved.

According to this method, the number of separate movements for building up a stack of articles is reduced. Consequently, an apparatus for carrying out this method can be of compact construction thus requiring little space.

The present invention also provides an apparatus for stacking articles comprising a receiving platform for assembling a row of articles, an elevator arranged for step by step movement along a vertical path adjacent to said platform, first transfer means for transferring successive rows of articles from the receiving platform on to said elevator, a stationary platform arranged adjacent to said vertical path opposite to the receiving platform, and second transfer means for transferring a block of articles assembled on the elevator on to the stationary platform, the first transfer means being arranged to transfer a row of articles over a distance, which is at least twice the width of a row of articles, when the second transfer means are in operation.

In order that the first transfer means can readily transfer a row of articles over a distance at least twice the width of the receiving platform when the second transfer means is in operation, the actuating mechanism of the first transfer means preferably moves in unison with the second transfer means.

Preferably each of the transfer means is constituted by a pushing member carried by the piston of an air cylinder, the air cylinder of the first transfer means being rigidly connected to the pushing member of the second transfer means.

The elevator may have a single loading platform and be arranged for step by step movement in a downward direction and also the receiving platform may move in unison with the second transfer means, which receiving platform is substantially flush with the top position of the elevator platform, the stationary platform being substantially flush with the bottom position of the elevator platform.

Preferably the air cylinder of the first transfer means and the receiving platform are mounted on a common slide fixed to the pushing member of the second transfer means.

According to another aspect of the invention, the elevator can be provided with a number of loading shelves above each other and is arranged for step by step movement in an upward direction, the receiving platform and the stationary platform being substantially flush with the bottom elevator shelf in its top position.

Embodiments of the present invention will now be described with reference to the accompanying drawings in which:

FIG. 1 is a schematic side elevation of a stacking apparatus partly in section;
FIG. 2 is a side view of the apparatus shown in FIG. 1;
FIG. 3 is a plan view of the apparatus shown in FIG. 1;
FIG. 4 is a schematic side elevation, partly in section, of a second embodiment.

The frame of the machine shown in the drawing consists of angle irons and rests on feet 1. The uprights 2, 3 of the frame are connected at their bottoms by cross beams 4, 5 and at their tops by cross beams 6, 7, 8, 9 and 10.

In the frame is arranged an elevator consisting of a horizontal loading platform 11 rigidly connected by means of a bracket 12 to a rod 13 which is slidable in a vertical direction in bearings 14 carried by the frame of the machine. The lower end of rod 13 is connected to a fork 15 which is situated at one end of a piston rod 16 of an air cylinder 17. The opposite end of cylinder 17 is connected to the frame of the machine.

The elevator 11, 13 is arranged to be moved in a single motion from its lowermost position, in which the loading platform 11 occupies the position shown in FIG. 1 at 18 by dotted lines, into its uppermost position shown in FIG. 1 by full lines when air cylinder 17 is actuated. The elevator 11, 13 moves in a downward direction under its own weight and the weight of the articles placed on the platform 11. In this direction the elevator covers its stroke in two separate steps. During the first step the platform 11 sinks from the position shown by full lines to an intermediate position indicated at 19 by dotted lines, and subsequently sinks from position 19 to position 18. This step by step movement of the elevator is obtained by co-operation of a pawl 20, fixed to rod 13, with a pawl 21 carried by a trip lever 22 the lower end of which is hinged to the frame of the machine and the upper end of which is hinged to a fork 23 mounted on the piston rod of an air cylinder 24. The opposite end of air cylinder 24 is hinged to the frame of the machine.

The elevator 11, 13 is kept in its uppermost position by a pawl 25 fixed to rod 13, resting on pawl 21. On actuation of air cylinder 24, the pawl 21 is moved out of the path of pawl 25 whereupon the platform 11 sinks to position 19, further downward movement being arrested by pawl 20 contacting pawl 21. Instead of utilising pawl 25 the elevator can be kept in its uppermost position by maintaining air cylinder 17 supplied with compressed air. In that case, the elevator sinks into position 19 when air cylinder 17 is no longer actuated. On actuation of air cylinder 24, the pawl 21 is moved out of the path of pawl 20, permitting platform 11 to sink from position 19 to position 18 in which position the platform is arrested because the piston of air cylinder 17 has reached one end of its stroke. On reaching the opposite end of its piston stroke, platform 11 is arrested in its uppermost position.

The articles A to be stacked are delivered to the machine by a conveyor belt 26 moving in the direction of the arrow shown in FIG. 2. The articles A enter the machine through a funnel 27 and are received on a receiving platform 28 which is substantially flush with platform 11 when the latter is in its uppermost position.

Platform 28 is mounted on a slide 29 by means of supports 30. Slide 29 also carries an air cylinder 31 by means of a bracket 32. Air cylinder 31 is arranged to push, by means of a pushing member 33, a row of articles assembled on the receiving platform 28 from this platform on to the elevator platform 11, when a switch 34 is actuated by a row of articles on platform 28.

The slide 29 can slide in a direction transverse to the row of articles assembled on platform 28 in bearings 35 carried by the frame of the machine.

Beneath slide 29 is arranged an air cylinder 36 mounted by means of a bracket 38 on a base plate 37 carried by the angle irons 8 and 9. The piston rod of air cylinder 36 carries a fork 39 to which a pusher plate 40 is attached by means of a bracket 41, the latter being rigidly connected to the slide 29. Platform 28 and pusher plate 40 consist of a single plate. The pusher plate 33 is integral with a locking plate 42 which closes the opening of funnel 27 when pusher plate 33 is moved from the position shown.

The arrangement described is such that on actuation of air cylinder 36 the pusher plate 40, receiving platform 28, slide 29 and air cylinder 31 move bodily together.

At the other side of the path of elevator 11, 13 opposite to platform 28 but at a level substantially flush with the lowermost position of elevator platform 11 is arranged a stationary platform 43. The latter is carried by brackets 44 attached to the cross beam 10.

Platform 43 is integral with end walls 45, 46 and thus constitutes a magazine 47 over which a box 38 shown in dotted lines may be placed.

The operation of the machine is as follows:

When the elevator platform 11 is in the position shown by full lines in FIGS. 1 and 2 and a complete row of articles has been assembled on the receiving platform 28 the switch 34 is actuated by the foremost article of the row. This results in actuation of cylinder 31, whereby the pusher plate 33 pushes the row of articles from platform 28 on to the elevator platform 11 until the pusher plate is in the position 49 indicated by dotted lines in FIG. 1. Simultaneously the opening of the funnel 27 is closed by locking plate 42.

As soon as the pusher plate 33 has reached position 49, the platform 11 sinks one step and is arrested in position 19. Simultaneously pusher plate 33 is retracted into its starting position.

When a new row of articles has been formed on platform 28 the process is repeated whereby a second layer of articles is pushed on top of the first layer of articles on elevator platform 11. When platform 11 has sunk to position 18 and a third row of articles has been assembled on platform 28, air cylinders 36 and 31 are actuated simultaneously. As a result, the block of articles constituted by the two lower layers in the example shown is pushed from platform 11 into the magazine 47, during which movement the block is completed with the third row of articles. Consequently, as these two steps coincide, the time taken to place a completed block in the magazine is reduced. When the pusher plate 33 has reached the position 50 shown by dotted lines in FIG. 1 and the pusher plate 40 has reached the position 51 shown by dotted lines, the pistons of both air cylinders are retracted after which the elevator 11, 13 is returned in a single movement to its starting position. The machine is now ready to carry out a new cycle of operations.

To allow the air cylinder 31 to work at high speed, a plate 52 is hinged to the frame of the machine and is pushed by a spring 53 resiliently into the path of the rows of articles when they are transferred from platform 28 on to the elevator. Thus the rows of articles are prevented from sliding beyond the elevator because of their inertia.

In the embodiment shown in FIG. 4, the elevator is provided with three shelves 54, 55 and 56 arranged above each other. In this embodiment the elevator accomplishes its upward movement in three separate steps and its downward movement in a single stroke. First shelf 56 is loaded with a row of articles by means of air cylinder 57 carried by a slide 58. Subsequently shelf 55 is loaded. Finally shelf 54 is loaded. Slide 58 is rigidly connected with the piston rod of an air cylinder 59. The opposite end of which is mounted on the frame of the machine by bracket 60. The piston rod of cylinder 59 carries a pushing plate 61 and a second pushing plate 62 is carried by a part 63 rigidly connected to slide 58 by brackets 64. Thus air cylinder 57 and the pushing plates 61, 62 move bodily together on actuation of cylinder 59.

After shelves 55 and 56 have been loaded and a new row of articles has been assembled on a fixed receiving platform 65, the air cylinders 57 and 59 are actuated simultaneously, whereby a complete block of articles is deposited into the magazine.

Although in the embodiments shown, blocks are formed consisting of three layers, each layer consisting of a single row of articles and each row consisting of six articles it will be clear that the invention is not limited to these embodiments. For example, each layer may consist of two or more adjacent rows of articles, in which case the piston of air cylinder 31 or 57 carries out a corresponding number of strokes before the elevator is moved one step further.

What is claimed is:

1. A method for stacking articles which comprises the steps of forming a horizontal row of articles, moving said row horizontally in a transverse direction over a distance at least equal to the width of the row in order to form a horizontal layer consisting of one or more adjacent rows, moving the layer vertically over a distance equal to its height, repeating said steps until the penultimate row has been added to the block of articles thus formed, completing said block by moving the final row with respect to the other rows in the same horizontal direction as the other rows were moved, and moving said block during its completion by the final row over a distance at least equal to its width in the same horizontal direction.

2. An apparatus for stacking articles comprising a receiving platform for assembling a row of articles, an elevator arranged for step by step movement along a vertical path adjacent to said platform, first transfer means for transferring successive rows of articles from the receiving platform on to said elevator, a stationary platform arranged adjacent to said vertical path opposite to the receiving platform, and second transfer means for transferring a block of articles assembled on the elevator on to the stationary platform, the first transfer means being arranged to transfer a row of articles from the receiving platform to complete said block of articles, while the second transfer means are transferring said block.

3. An apparatus as claimed in claim 2 in which the movement of said first transfer means to complete said block of articles coincides with the movement of the second transfer means.

4. An apparatus as claimed in claim 2 including an actuating mechanism for the first transfer means, said actuating mechanism moving in unison with the second transfer means.

5. An apparatus as claimed in claim 4 in which each of the transfer means is constituted by a pusher member and the actuating mechanism for each of the transfer means is constituted by an air cylinder and piston movable in said air cylinder, the pusher member being carried by its respective piston, and the air cylinder of the first transfer means being rigidly connected to the pusher member of the second transfer means.

6. An apparatus as claimed in claim 5 in which the air cylinder of the first transfer means and the receiving platform are mounted on a common slide fixed to the pusher member of the second transfer means.

7. An apparatus as claimed in claim 2 in which the elevator has a loading platform and is arranged for step by step movement in a downward direction, the receiving platform moving in unison with the second transfer means and being substantially flush with the top position of the elevator platform, the stationary platform being substantially flush with the bottom position of the elevator platform.

8. An apparatus as claimed in claim 2 in which the elevator is provided with a number of loading shelves above each other and is arranged for step by step movement in an upward direction, the receiving platform and the stationary platform being substantially flush with the bottom elevator shelf in its top position.

9. An apparatus for stacking articles comprising a receiving platform for assembling a row of articles, an elevator arranged for step by step movement along a vertical path adjacent to said platform, a pusher member, actuating means for the pusher member comprising an air cylinder and a piston movable in said cylinder, so that on actuation by said actuating means the pusher member transfers successive rows of articles from the receiving platform on to said elevator, a stationary platform arranged adjacent to said vertical path opposite to the receiving platform, a second pusher member, and actuating means for the second pusher member comprising an air cylinder and a piston movable in said cylinder, so that on actuation by said actuating means the second pusher member transfers a block of articles assembled on the elevator onto the stationary platform, the first mentioned air cylinder being rigidly connected to the second mentioned pusher member.

References Cited in the file of this patent

UNITED STATES PATENTS

| | | |
|---|---|---|
| 1,881,844 | Morris | Oct. 11, 1932 |
| 2,813,638 | Miller | Nov. 19, 1957 |
| 2,883,074 | Boehl et al. | Apr. 21, 1959 |
| 3,027,020 | McCoy | Mar. 27, 1962 |